United States Patent [19]

Smith

[11] 3,962,616
[45] June 8, 1976

[54] START-UP CONTROL FOR DC MOTORS
[75] Inventor: Robert L. Smith, Granville, Ill.
[73] Assignee: Electronic Memories and Magnetics Corporation, Los Angeles, Calif.
[22] Filed: Sept. 6, 1974
[21] Appl. No.: 503,972

[52] U.S. Cl. .............................. 318/400; 318/341
[51] Int. Cl.² ........................................ H02P 1/18
[58] Field of Search .......... 318/341, 385, 391, 400, 318/415, 416

[56] References Cited
UNITED STATES PATENTS

| | | | |
|---|---|---|---|
| 3,453,517 | 7/1969 | Kennedy et al. | 318/341 X |
| 3,525,915 | 8/1970 | Barter | 318/341 |
| 3,599,062 | 8/1971 | Crane et al. | 318/341 X |
| 3,629,677 | 12/1971 | Means | 318/341 |

Primary Examiner—Gene Z. Rubinson
Assistant Examiner—W. E. Duncanson, Jr.
Attorney, Agent, or Firm—Lindenberg, Freilich, Wasserman, Rosen & Fernandez

[57] ABSTRACT

Start-up power control of a full wave rectifier supply to a DC permanent magnet motor is provided by an SCR full wave rectifier bridge and a start-up control circuit for the SCR's comprising an independent rectifier for charging up a capacitor through a high impedance path to produce a start-up ramp voltage, a UJT relaxation oscillator powered by the independent rectifier bridge to trigger the SCR's through a transformer, and a series transistor control circuit for the UJT responsive to the ramp voltage to advance the firing angle of th UJT and thereby advance the firing angle of the SCR's as the ramp voltage increases fron 0 to a maximum.

8 Claims, 2 Drawing Figures

START-UP CONTROL FOR DC MOTORS

BACKGROUND OF THE INVENTION

This invention relates to controlled rectifier circuits for supplying direct current to a motor or other type of load from an alternating source, and more particularly to automatic control for the rectifier circuit to limit acceleration of the motor. DC motors can be operated with single phase AC current by converting the AC current to DC current through a full-wave diode bridge rectifier. Once power is supplied, the motor receives full power. The speed of the motor with full power is determined only by its design.

A wide variety of silicon-controlled-rectifier (SCR) circuits have been developed in order to obtain more control over DC motors than simple on/off control. SCR circuits are designed around full-wave, or half-wave, rectifiers to control motor speed by controlling the SCR firing angle. Generally feedback circuits compensate for motor losses and maintain constant speed over a wide range of load conditions. Such SCR circuits are not suitable for applications having only two modes of operation, namely power off and full power on, due to the complexity of the feedback circuits not necessary if full power is to be applied all the time once the motor has reached full operating speed. Examples of applications requiring only full power when on are pumps, conveyors, fans, vacuum sweepers and the like, where speed regulation for varying load conditions is not required, and instead full design speed of the motor is desired.

If a permanent-magnet motor is provided with only on/off control there is a problem in that during acceleration immediately after applying power, the DC current reaches a high level. In most permanent magnet motor designs, this current can partially demagnetize the field magnets. Another problem is that a permanent-magnet motor has high starting torque and could cause damage to the load, such as damage to the fan and brush in a vacuum sweeper. To avoid such damage and/or partial demagnetization of the field magnets, it is desirable to control the power applied to the motor during acceleration of the motor to its designed speed.

SUMMARY OF THE INVENTION

In accordance with the present invention, at least one silicon-controlled rectifier (SCR) is provided to rectify AC current for delivery to a DC motor or other type of load. A control transformer is provided with a separate secondary winding for each SCR connected between the cathode and control electrode of the SCR. An additional rectifier not involving any SCR is connected to receive current from the AC power supply and provide rectified current to a control circuit comprising means for generating a ramp voltage signal from the rectified current, a unijunction (UJT) relaxation oscillator powered by the additional rectifier to trigger the SCR(s) through the control transformer which has its primary winding in series with the UJT, and a series transistor control circuit for the UJT responsive to the ramp signal to advance the firing angle of the UJT, and thereby advance the firing angle of the SCR's in the main rectifier. The main rectifier is preferably a full wave rectifier having a rectifying bridge comprising two diodes in adjacent branches connected to circuit ground and two SCR's in adjacent branches connected to the load. The additional rectifier is also preferably a fullwave rectifier comprised of a diode bridge. The two diodes of the main rectifier are shared with the additional rectifier.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
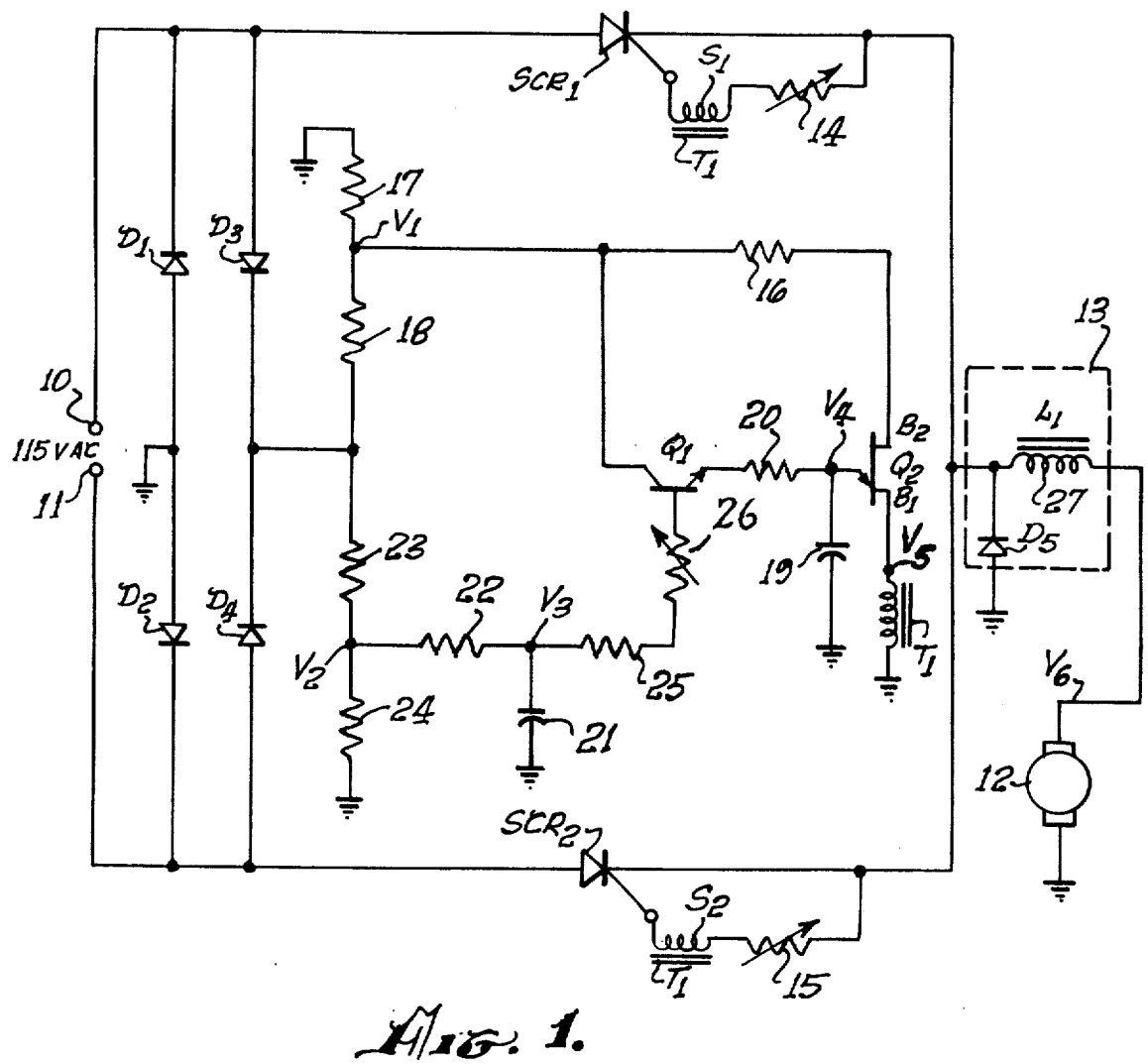
FIG. 1 is a circuit diagram of a preferred embodiment of the present invention.

Referring now to the circuit diagram in FIG. 1, the current from an AC source (115V) connected across terminals 10 and 11 is rectified and applied to a load 12, such as a permanent-magnet DC motor, through a full wave bridge rectifier consisting of diodes $D_1$ and $D_2$ in adjacent branches connected to circuit ground and silicon-controlled-rectifiers $SCR_1$ and $SCR_2$ in adjacent branches connected to the load 12 through an optional circuit 13. A control transformer $T_1$ has two secondary windings $S_1$ and $S_2$ connected between the control electrode and cathode of the $SCR_1$ and $SCR_2$, respectively. In series with the secondary windings $S_1$ and $S_2$ are respective resistors 14 and 15 used to balance the firing angles of the SCR's.

Connected to the power supply terminals 10 and 11 is an additional full-wave bridge rectifier comprised of diodes $D_1$ through $D_4$. The diodes $D_1$ and $D_2$ are shared with the main full-wave rectifier. The output of the additional rectifier at the junction between the diodes $D_3$ and $D_4$ is used to power a relaxation oscillator comprising a unijunction transistor (UJT) having its base-one terminal ($B_1$) connected to the primary winding of the transformer $T_1$ and its base-two terminal ($B_2$) connected by a resistor 16 to a first voltage dividing network comprising resistors 17 and 18 connected between the output of the additional rectifier and circuit ground. The emitter terminal of the UJT is connected to an integrating capacitor 19. That integrating capacitor is charged through a resistor 20 and a series control transistor $Q_1$ having its collector connected to the voltage dividing network and its emitter connected to the resistor 20. The base electrode of the transistor $Q_1$ is connected to a ramp generator comprised of an integrating capacitor 21 connected by a resistor 22 to a second voltage dividing network comprised of resistors 23 and 24 connected between the output of the additional full-wave rectifier and circuit ground. The output of the ramp generator is DC coupled to the base of the transistor $Q_1$ by a resistor 25 and a potentiometer 26. The potentiometer is induced to vary the total resistance in the base emitter circuit and thereby determine how fast the transistor $Q_1$ switches from cut-off to saturation through the active region. Once the transistor $Q_1$ is turned on, the integrating capacitor 19 of the UJT relaxation oscillator charges to fire the UJT.

Figure 2:
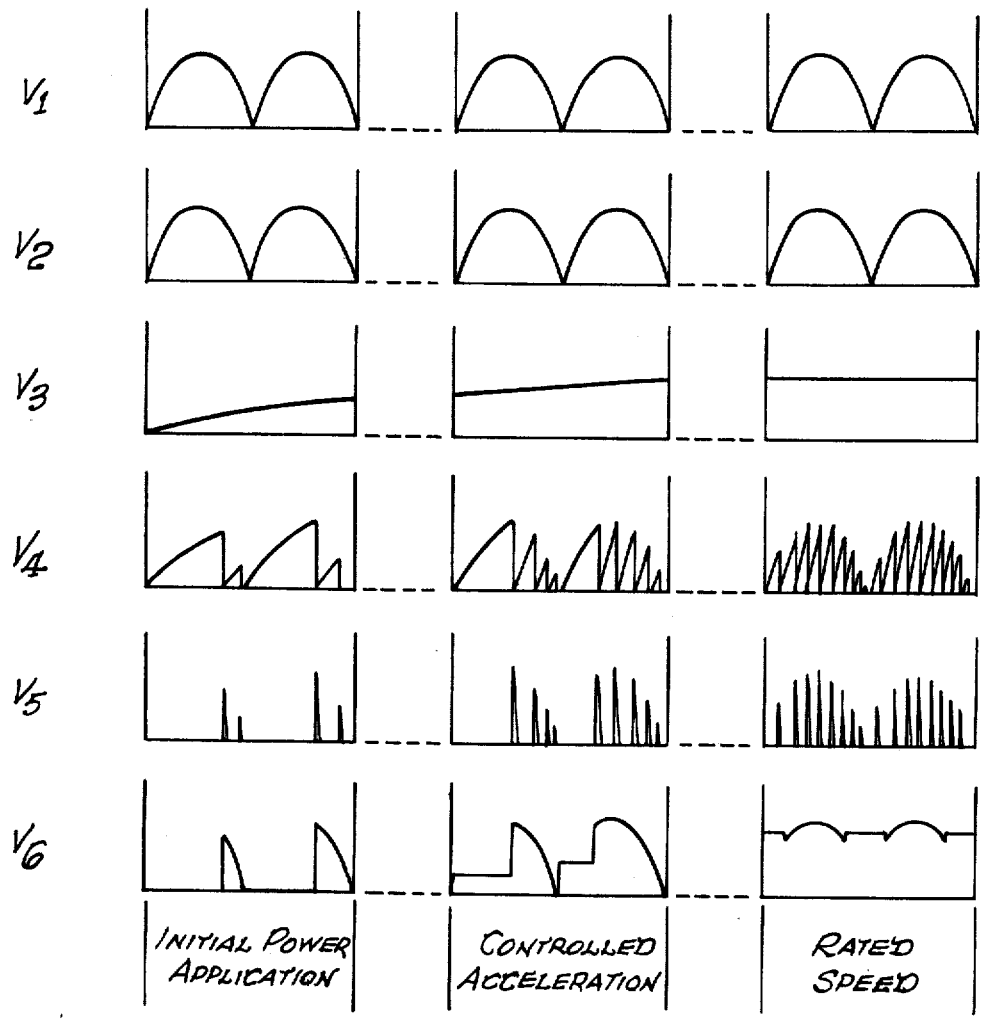
FIG. 2 is a waveform diagram of voltages appearing at different points in the circuit of FIG. 1 during three phases namely initial power application, controlled acceleration, and rated speed as a DC motor is accelerated up to speed.

In operation, the respective outputs of the first and second voltage dividing networks are as shown in waveforms $V_1$ and $V_2$ of FIG. 2. The waveforms shown in FIG. 2 and referenced in the following description are the voltages appearing at several points indicated in the circuit diagram of FIG. 1. As the integrating capacitor 21 charges from zero to a maximum, as shown by waveform $V_3$ of FIG. 2, the integrating capacitor 19 is permitted to charge from zero toward a peak value determined by the peak of the voltage $V_1$. Since the charging voltage $V_1$ is also being applied to base-two of the UJT, the UJT will turn on very late in each half cycle of the full-wave rectifier during initial power application as determined by the amplitude of the ramp voltage signal which controls the series-control transistor $Q_1$ to establish the time required for the emitter voltage $V_4$ to exceed the emitter peak point voltage at which time the emitter current is greater than the peak point current to cause the UJT to turn on and quickly discharge the capacitor 19 through the primary winding of the control transformer $T_1$, as indicated by the waveform of the voltage $V_5$ in FIG. 2. The pulse thus produced across the control transformer triggers one of the SCR's (whichever happens to be forward biased) during that half cycle to produce an output to the load, as shown by the voltage waveform $V_6$ in FIG. 2. The UJT may be fired a second time during that first half cycle as shown in the waveform $V_5$, but since the SCR is already conducting, the presence of the additional smaller pulse across the control transformer will have no effect on the initial power applied to the load. Only the first pulse from the UJT relaxation oscillator occuring during a half cycle of the output of the primary full-wave rectifier will have any effect on the power applied to the load.

As the ramp signal $V_3$ increases, the conduction through the transistor $Q_1$ increases to cause the capacitor 19 to charge more quickly and thus cause the UJT to be fired earlier in each half cycle of the signal $V_1$. As the angle at which the UJT is fired advances, the angle at which the SCR's are triggered also advance to increase the power applied to the load.

The circuit 13 comprised of an inductor 27 and diode $D_5$ will tend to filter the power applied to the load as is shown for successive half cycles of operation for the voltage $V_6$. Two successive half cycles during a phase intermediate the initial application of power and the final phase of operation at rated speed illustrate not only the manner in which the firing angle of the UJT is advanced, but also how power applied to the load is increased. The optional inductor 27 affects the electrical time constant of the motor and would be used in the event the motor inductance is relatively small, namely to limit the peak current during start up and to lower the heat losses during normal load. The diode $D_5$ is an option which can be added in order to allow energy stored up by the motor inductance to dissipate during the time both SCR's are off. That will allow the motor to run smoother and cooler.

During the final phase (rated speed) illustrated in FIG. 2, the UJT is fired very early during each half cycle of the signal $V_1$. The initial pulse from the UJT during each successive half cycle fires $SCR_1$ and $SCR_2$. Once each SCR is turned on, it will conduct through substantially the rest of the half cycle, as noted hereinbefore, so that subsequent pulses that may be emitted by the UJT as shown in the waveform $V_5$ will have virtually no effect on the power applied to the load while operating at rated speed.

Once rated speed has been reached, it will be maintained as long as the voltage $V_3$ remains at its constant maximum level, which is as long as AC power is applied to the terminals 10 and 11. When the AC power is removed, the voltage $V_6$ applied to the load will quickly drop to zero since voltage is immediately removed from the anodes of the SCR's in the main full-wave rectifier. The output of the additional full-wave rectifier will also immediately drop to zero, and the capacitors 19 and 21 will discharge. Thereafter, when AC power is again applied to the terminals 10 and 11, the entire sequence will repeat itself through the three phases shown in FIG. 2. In that manner the voltage $V_6$ applied to the load is increased gradually to a maximum, thus limiting the acceleration of the motor, and limiting the peak current levels. This is of particular advantage in a DC motor having a permanent magnet field, such as a motor in a vacuum sweeper. The motor has high starting torque and could cause damage to the fan and brush. Also, extremely high starting current can cause the permanent magnets to become partially demagnetized.

Other modifications and variations may readily occur to those skilled in the art. For example, both the main rectifier and the additional rectifier may be half-wave rectifiers, in which case the diodes $D_2$ and $D_4$ and the silicon-controlled rectifier $SCR_2$ would be omitted. Also, the voltage divider comprising resistors 23 and 24 may be omitted by connecting the resistor 22 through which the capacitor 21 is charged to the voltage dividing network comprising resistor 17 and 18. However, it is preferred to have full-wave rectifiers, particularly if the load is a DC motor, and it is preferred to isolate the ramp generator comprising the capacitor 21 and resistor 22 from the power supply for the transistors $Q_1$ and $Q_2$ in order to minimize coupling of switching transients in the UJT relaxation oscillator from the ramp generator. Consequently it is intended that the claims be interpreted to cover such modifications and variations.

What is claimed is:

1. A controlled rectifier supply from an AC power source to a load comprising at least one silicon-controlled rectifier connected to rectify power from said source to said load, and thus produce rectified sinusoidal voltage pulses, a control transformer having a secondary winding connected between the cathode and control electrode of said silicon-controlled rectifier, said transformer having its primary winding connected to a control circuit, and a diode rectifier connected to rectify current from said source and deliver to said control circuit rectified sinusoidal voltage pulses, said control circuit comprising means connected to said diode rectifier for generating a ramp voltage signal from said rectified current, and a voltage-controlled relaxation oscillator powered by rectified current from said diode rectifier and responsive to said ramp voltage signal for producing a trigger pulse through the primary winding of said control transformer at a time during each cycle of said rectified sinusoidal voltage pulse that is inversely proportional to the amplitude of said ramp voltage signal.

2. The combination of claim 1 wherein said load is a motor.

3. The combination of claim 1 wherein said relaxation oscillator comprises a unijunction transistor having its base-two electrode connected to receive rectified current from said diode rectifier through a resistor having its base-one to base-two circuit in series with the primary winding of said control transformer, an integrating capacitor connected between the emitter of said unijunction transistor and circuit ground, a series control transistor having its collector-to-emitter circuit in series between said diode rectifier and said emitter, and its base electrode connected to receive said ramp voltage signal.

4. The combination of claim 3 including a second silicon-controlled rectifier connected in a rectifying bridge with said one silicon-controlled rectifier, and a second secondary winding on said control transformer connected between the cathode and control electrode of said second silicon-controlled rectifier, and said diode rectifier is comprised of a diode bridge.

5. The combination of claim 4 wherein said rectifying bridge comprising said one and said second silicon-controlled rectifier includes two diodes of said diode bridge.

6. The combination of claim 5 wherein said ramp voltage signal generating means is connected to said diode bridge through a first voltage dividing network, and said relaxation oscillator is connected to said diode bridge through a second voltage dividing network.

7. The combination of claim 6 wherein said load is a motor.

8. The combination of claim 7 including a diode in shunt with said motor, said shunting diode being poled to shunt current of a polarity opposite rectified current pulses applied to said motor from said silicon-controlled-rectifier.

* * * * *